United States Patent
Katayama

(10) Patent No.: US 10,658,892 B2
(45) Date of Patent: May 19, 2020

(54) ROTOR FOR ROTATING ELECTRICAL MACHINE

(71) Applicant: AISIN AW CO., LTD., Anjo-shi, Aichi-ken (JP)

(72) Inventor: Shinya Katayama, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 6 days.

(21) Appl. No.: 16/080,814

(22) PCT Filed: Mar. 31, 2017

(86) PCT No.: PCT/JP2017/013528
§ 371 (c)(1),
(2) Date: Aug. 29, 2018

(87) PCT Pub. No.: WO2017/170982
PCT Pub. Date: Oct. 5, 2017

(65) Prior Publication Data
US 2019/0097478 A1    Mar. 28, 2019

(30) Foreign Application Priority Data
Mar. 31, 2016  (JP) .................. 2016-072426

(51) Int. Cl.
*H02K 1/27*    (2006.01)
*H02K 15/02*   (2006.01)
(Continued)

(52) U.S. Cl.
CPC .............. *H02K 1/276* (2013.01); *H02K 1/27* (2013.01); *H02K 1/28* (2013.01); *H02K 1/32* (2013.01);
(Continued)

(58) Field of Classification Search
CPC .............. H02K 1/276; H02K 1/28; H02K 1/32
(Continued)

(56) References Cited

U.S. PATENT DOCUMENTS 6,329,734 B1 * 12/2001 Takahashi .............. H02K 1/246
                                                              310/156.07
9,484,790 B2 * 11/2016 Takahashi ................ H02K 9/22
(Continued)

FOREIGN PATENT DOCUMENTS

JP    H07-194073 A    7/1995
JP    2001-169485 A   6/2001
(Continued)

OTHER PUBLICATIONS

Jun. 13, 2017 International Search Report issued in International Patent Application No. PCT/JP2017/013765.
(Continued)

*Primary Examiner* — Hanh N Nguyen
(74) *Attorney, Agent, or Firm* — Oliff PLC

(57) ABSTRACT

A rotor for a rotating electrical machine, the rotor including: a rotor core having a magnet insertion hole extending in an axial direction that is a direction along a rotor rotational axis; and a permanent magnet fixed inside the magnet insertion hole with an adhesive, wherein the permanent magnet has a magnet-side flat surface that is formed as a rectangular flat surface, wherein the magnet insertion hole has, in an internal surface thereof, a hole-side flat surface that is formed as a flat surface facing the magnet-side flat surface, and wherein the adhesive is a foaming adhesive and is provided at least at four corners of the magnet-side flat surface, and a thickness of the adhesive at a center of the magnet-side flat surface is smaller than a thickness of the adhesive at the four corners.

9 Claims, 5 Drawing Sheets

(51) Int. Cl.
*H02K 1/28* (2006.01)
*H02K 1/32* (2006.01)
*H02K 9/19* (2006.01)
*H02K 15/03* (2006.01)
*H02K 15/12* (2006.01)

(52) U.S. Cl.
CPC .............. *H02K 9/19* (2013.01); *H02K 15/02* (2013.01); *H02K 15/03* (2013.01); *H02K 15/12* (2013.01)

(58) Field of Classification Search
USPC .................................. 310/43, 156.01–156.84
See application file for complete search history.

(56) References Cited

U.S. PATENT DOCUMENTS

| | | | |
|---|---|---|---|
| 2006/0103253 A1* | 5/2006 | Shiga | H02K 1/2786 310/156.45 |
| 2007/0205686 A1 | 9/2007 | Ishida | |
| 2013/0032090 A1 | 2/2013 | Yano | |
| 2016/0261158 A1 | 9/2016 | Horii et al. | |

FOREIGN PATENT DOCUMENTS

| | | |
|---|---|---|
| JP | 2005-312259 A | 11/2005 |
| JP | 2007-060836 A | 3/2007 |
| JP | 2007-151362 A | 6/2007 |
| JP | 2013-031805 A | 2/2013 |
| JP | 2013-066345 A | 4/2013 |
| JP | 2015-050856 A | 3/2015 |
| JP | 2015-055062 A | 3/2015 |
| JP | 2015-173748 A | 10/2015 |
| WO | 2007/007420 A1 | 1/2007 |
| WO | 2015/087445 A1 | 6/2015 |

OTHER PUBLICATIONS

May 16, 2017 International Search Report issued in International Patent Application No. PCT/JP2017/013528.

U.S. Appl. No. 16/080,391 filed Aug. 28, 2018 in the name of Hideharu Ushida et al.

* cited by examiner

ROTOR FOR ROTATING ELECTRICAL MACHINE

BACKGROUND

The present disclosure relates to a rotor for a rotating electrical machine including a rotor core having a magnet insertion hole and a permanent magnet fixed inside the magnet insertion hole with an adhesive.

For example, Japanese Patent Application Publication No. 2001-169485 (JP 2001-169485 A) discloses a permanent-magnet motor [10] in which permanent magnets [15] are fixed to a rotor [12] by using foaming of a resin material [17] serving as an adhesive (the numbers in brackets are the reference signs in JP 2001-169485 A). In JP 2001-169485 A, the rotor [12] has a plurality of salient poles [14] disposed at predetermined intervals in a circumferential direction, and insertion holes into which the permanent magnets [15] are inserted are formed between the salient poles [14 , 14] adjacent to each other in the circumferential direction. The insertion holes each have a seating surface [14A] facing an inner circumferential surface [15B] of the permanent magnet [15], and the plate-shaped resin material [17] is provided on the seating surface [14A]. Thus, the resin material [17] is disposed between the inner circumferential surface [15B] of the permanent magnet [15] and the seating surface [14A]. In JP 2001-169485 A, to fix the permanent magnet [15], the resin material [17] is thermally expanded so as to shift the permanent magnet [15] toward a radially outer side and press an outer circumferential surface [15A] of the permanent magnet [15] against catches "16" of the salient poles [14].

SUMMARY

In JP 2001-169485 A, the plate-shaped resin material [17] is disposed so as to cover the entire inner circumferential surface [15B] of the permanent magnet [15], and thus the resin material [17] has a large area. In such a configuration, if the thickness of the resin material [17] varies by location, the permanent magnet [15] pressed by the resin material [17] is inclined, so that the permanent magnet [15] cannot always be disposed at an appropriate position. Therefore, the resin material [17] needs to be molded with high accuracy so as to have an even plate thickness as a whole, which poses a problem of controlling the thickness of the resin material [17].

Thus, it is desired to realize a rotor for a rotating electrical machine which has a structure that can suppress complicating the manufacturing process and in which permanent magnets are appropriately positioned inside magnet insertion holes.

According to an exemplary aspect of the disclosure, a rotor for a rotating electrical machine includes: a rotor core having a magnet insertion hole extending in an axial direction that is a direction along a rotor rotational axis; and a permanent magnet fixed inside the magnet insertion hole with an adhesive, wherein the permanent magnet has a magnet-side flat surface that is formed as a rectangular flat surface, wherein the magnet insertion hole has, in an internal surface thereof, a hole-side flat surface that is formed as a flat surface facing the magnet-side flat surface, and wherein the adhesive is a foaming adhesive and is provided at least at four corners of the magnet-side flat surface, and a thickness of the adhesive at a center of the magnet-side flat surface is smaller than a thickness of the adhesive at the four corners.

According to this characteristic structure, the adhesive having a foaming property is provided so that the thickness of the adhesive at the four corners is larger than the thickness thereof at the center in the magnet-side flat surface. The adhesive thus provided at the four corners foams in the manufacturing process and thereby presses the permanent magnet from a hole-side flat surface side. As a result, the permanent magnet is pressed against an internal surface inside the magnet insertion hole that is a surface opposite to the hole-side flat surface. In this state, the four corners of the magnet-side flat surface of the permanent magnet are pressed by the adhesive, while the center of the magnet-side flat surface is not pressed by the adhesive. This makes it likely that the permanent magnet is pressed relatively evenly against the internal surface inside the magnet insertion hole opposite to the hole-side flat surface. Thus, the permanent magnet is appropriately positioned inside the magnet insertion hole.

Since the thickness of the adhesive at the center is smaller than the thickness thereof at the four corners in the magnet-side flat surface, the four corners of the magnet-side flat surface of the permanent magnet are pressed by the adhesive while the center of the magnet-side flat surface is not pressed by the adhesive. Therefore, it is not necessary to strictly control the thickness of the adhesive at the center of the magnet-side flat surface unlike the thickness thereof at the four corners. Thus, the thickness of the adhesive is easier to control than in the case where the thickness of the adhesive in the entire magnet-side flat surface is controlled in the same manner as the thickness of the adhesive provided at the four corners.

DETAILED DESCRIPTION OF EMBODIMENTS

Embodiments of a rotor for a rotating electrical machine will be described with reference to the drawings. The term "rotating electrical machine" is used as a concept including all of a motor (electrical motor), a generator (power generator), and a motor-generator that fulfils the functions of both a motor and a generator as necessary. In this specification, words related to dimensions, orientations, positions, etc. are used as concepts including a state where there is a difference due to an error (an acceptable level of error in manufacturing). In the following description, unless otherwise specified, an "axial direction L," "radial direction R," and "circumferential direction C" are defined based on a rotor rotational axis A (a rotating shaft center; see FIG. 1) of a rotor for a rotating electrical machine (hereinafter referred to as a "rotor 3"). An inner side in the radial direction R will be referred to as a radially inner side R1, and an outer side in the radial direction R will be referred to as a radially outer side R2. One side in the circumferential direction C will be referred to as a first circumferential side C1, and the other side in the circumferential direction C will be referred to as a second circumferential side C2. The rotor rotational axis A is an imaginary axis, and a rotor core 10 (a rotor shaft 4 to which the rotor core 10 is fixed) rotates around the rotor rotational axis A.

Figure 1:
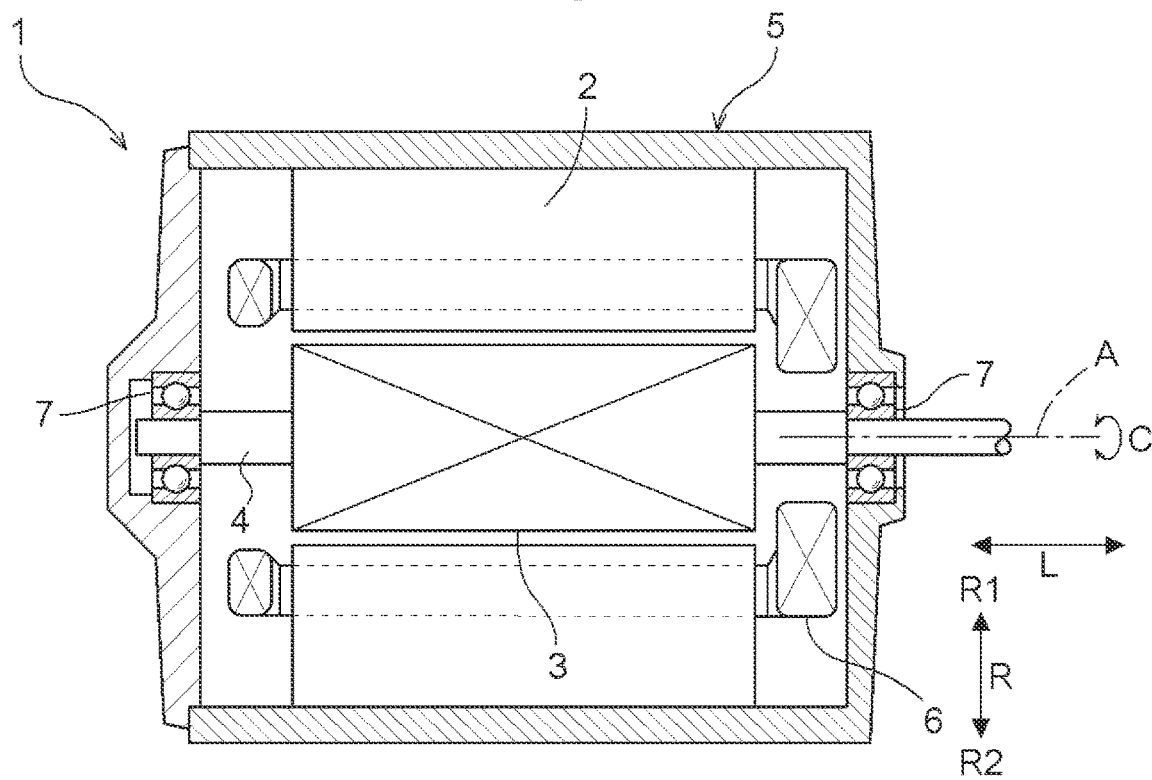
FIG. 1 is a view showing a part of a rotating electrical machine.

As shown in FIG. 1, the rotating electrical machine 1 includes a stator 2 and the rotor 3. In the example shown in FIG. 1, the rotating electrical machine 1 is housed in a case 5, with the stator 2 fixed to an internal surface of the case 5 and the rotor 3 supported so as to be rotatable relative to the case 5. Specifically, the rotor 3 includes the rotor shaft 4 that is supported on the case 5 through bearings 7 so as to be rotatable relative to the case 5, and the rotor core 10 (see FIG. 2) that is the core of the rotor 3 is coupled so as to rotate integrally with the rotor shaft 4. The rotating electrical machine 1 is a revolving-field type rotating electrical machine, and a coil 6 is wound around the core of the stator 2. A magnetic field generated from the stator 2 causes the rotor 3 to rotate.

In this embodiment, the rotating electrical machine 1 is an inner-rotor rotating electrical machine. The rotor 3 is disposed on the radially inner side R1 of the stator 2 in a state where the rotor 3 can rotate relative to the stator 2.

Figure 2:
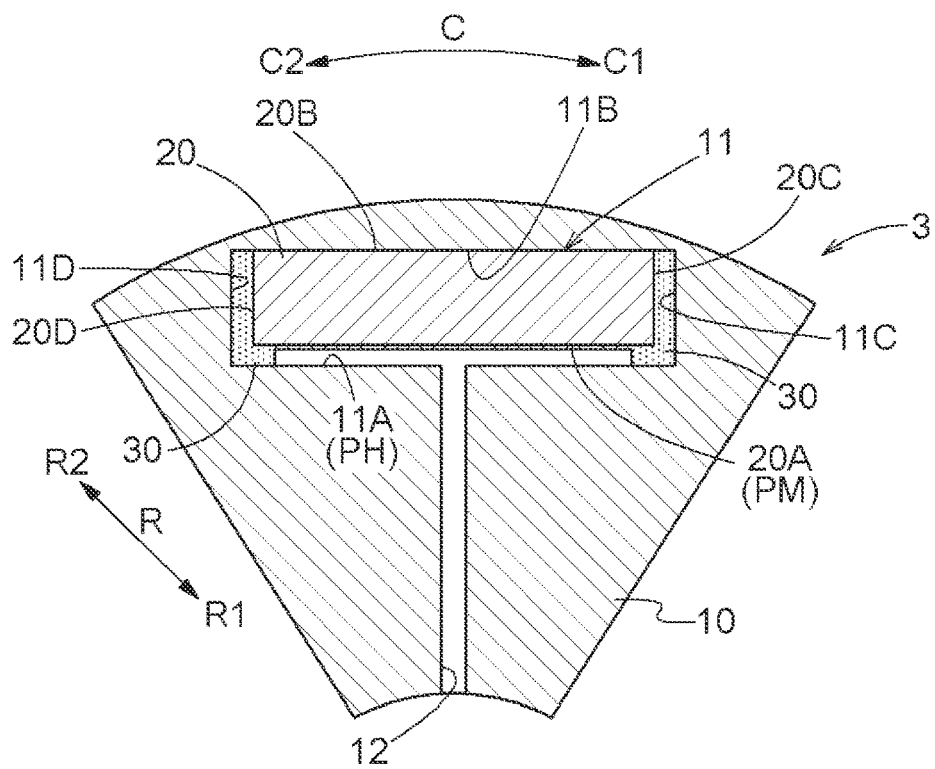
FIG. 2 is a radial sectional view of a rotor core.

As shown in FIG. 2, the rotor 3 includes the rotor core 10 having a magnet insertion hole 11 extending in the axial direction L, and a permanent magnet 20 fixed inside the magnet insertion hole 11 with an adhesive 30. Thus, the rotor 3 is a rotor that is used for a rotating electrical machine (e.g., a synchronous electrical motor) having an embedded magnet structure. For example, the rotor core 10 is formed by stacking a plurality of annular plate-shaped magnetic plates (e.g., magnetic steel sheets) in the axial direction L. In this case, through-holes formed in the respective magnetic plates communicate with one another in a stacking direction (axial direction L) to form the magnet insertion hole 11.

The rotor core 10 includes a plurality of magnet insertion holes 11 in which the permanent magnets 20 are inserted. The magnet insertion holes 11 are formed at regular intervals along the circumferential direction C, and are formed so as to extend parallel to the axial direction L. The length of the permanent magnets 20 in the axial direction L is a length corresponding to the length of the magnet insertion holes 11 in the axial direction L. In this embodiment, the magnet insertion holes 11 extend through the rotor core 10 across both sides thereof in the axial direction L, and the length of the magnet insertion holes 11 in the axial direction L is equal to the length of the permanent magnets 20 in the axial direction L.

The permanent magnets 20 each have a magnet-side flat surface part PM (magnet-side flat surface) that is formed as a rectangular flat surface. That is, the permanent magnet 20 may have any shape that includes a rectangular flat surface as the magnet-side flat surface part PM at some part. In most cases, however, the permanent magnet 20 used for the rotor 3 of the rotating electrical machine 1 has typically such a shape that a surface facing the radial direction R is large so as to generate a large amount of magnetic flux toward the stator 2. Therefore, in view of stably fixing the permanent magnet 20, it is desirable that the magnet-side flat surface part PM be a surface facing the radially inner side R1 or the radially outer side R2 that is a relatively large surface. In view of generating a large amount of magnetic flux toward the stator 2, it is also desirable that the permanent magnet 20 be disposed close to the radially outer side R2 inside the magnet insertion hole 11. It is therefore desirable that the magnet-side flat surface part PM to which the adhesive 30 is applied be the surface facing the radially inner side R1. In other words, it is preferable that the magnet-side flat surface part PM be set such that a line normal to the magnet-side flat surface part PM has a component oriented toward the radially inner side R1 of the rotor core 10.

In this embodiment, the permanent magnets 20 each have a rectangular parallelepiped shape. More specifically, as shown in FIG. 2, the permanent magnet 20 has a rectangular cross-sectional shape with the width in the circumferential direction C larger than the width in the radial direction R. In this example, as can be seen from FIG. 1, the permanent magnet 20 has a shape with the length in the axial direction L larger than the width in the circumferential direction C. In this embodiment, the permanent magnet 20 has an inner-side surface part 20A, an outer-side surface part 20B, a first-side surface part 20C, and a second-side surface part 20D. The inner-side surface part 20A is formed by the surface facing the radially inner side R1 among surfaces of the permanent magnet 20. The outer-side surface part 20B is formed by the surface facing the radially outer side R2 among the surfaces of the permanent magnet 20. The first-side surface part 20C is formed by a surface facing the first circumferential side C1 among the surfaces of the permanent magnet 20. The second-side surface part 20D is formed by a surface facing the second circumferential side C2 among the surfaces of the permanent magnet 20. In this example, each of the inner-side surface part 20A, the outer-side surface part 20B, the first-side surface part 20C, and the second-side surface part 20D is formed as a rectangular flat surface. The inner-side surface part 20A of this embodiment corresponds to the "magnet-side flat surface part PM," and the first-side surface part 20C and the second-side surface part 20D of this embodiment correspond to the "side surface parts" facing the circumferential direction C.

The permanent magnet 20 is installed in such a position that a line normal to the inner-side surface part 20A has a component oriented toward the radially inner side R1. Here, that "a normal line has a component oriented toward the radially inner side R1" is a concept that includes not only a state where the normal line extends along the radial direction R as in this embodiment but also a state where the normal line is inclined relative to the radial direction R. In this embodiment, the permanent magnet 20 is disposed in a state where a line normal to the inner-side surface part 20A is oriented toward the radially inner side R1, i.e., a state where a line normal to the inner-side surface part 20A is parallel to the radial direction R. Here, a cross-section of the permanent magnet 20 orthogonal to the radial direction R has a rectangular shape, and both a line normal to the inner-side surface part 20A and a line normal to the outer-side surface part 20B are oriented parallel to the radial direction R.

The magnet insertion holes 11 each have, in an internal surface thereof, a hole-side flat surface part PH (hole-side flat surface) that is formed as a flat surface facing the magnet-side flat surface part PM. Specifically, the internal surface of the magnet insertion hole 11 has a shape including a flat surface facing the magnet-side flat surface part PM of the permanent magnet 20. Moreover, the internal surface of the magnet insertion hole 11 has a shape matching the shape of the permanent magnet 20 such that the permanent magnet 20 can be held inside the magnet insertion hole 11. For example, the internal surface of the magnet insertion hole 11 has a shape similar to the shape of an external surface of the permanent magnet 20. In the case where the magnet-side flat surface part PM is the surface facing the radially inner side R1, the hole-side flat surface part PH is a surface facing the radially outer side R2. A clearance functioning as a flux barrier that limits passage of magnetic flux of the permanent magnet 20 may be formed continuously with the magnet insertion hole 11 or adjacent to the magnet insertion hole 11.

In this embodiment, the internal surface of the magnet insertion hole 11 has a rectangular parallelepiped shape similar to the shape of the external surface of the permanent magnet 20. More specifically, as shown in FIG. 2, the magnet insertion hole 11 has a rectangular cross-sectional shape with the width in the circumferential direction C larger than the width in the radial direction R. Thus, the magnet insertion hole 11 is a hole having a rectangular shape as seen from the axial direction L and extending in the axial direction L. In this embodiment, the internal surface of the magnet insertion hole 11 has an inner-side internal surface part 11A, an outer-side internal surface part 11B, a first-side internal surface part 11C, and a second-side internal surface part 11D. The inner-side internal surface part 11A is a surface that is located on the radially inner side R1 relative to the permanent magnet 20 and faces the inner-side surface part 20A of the permanent magnet 20.

The outer-side internal surface part 11B is a surface that is located on the radially outer side R2 relative to the permanent magnet 20 and faces the outer-side surface part 20B of the permanent magnet 20. The first-side internal surface part 11C is a surface that is located on the first circumferential side C1 relative to the permanent magnet 20 and faces the first-side surface part 20C of the permanent magnet 20. The second-side internal surface part 11D is a surface that is located on the second circumferential side C2 relative to the permanent magnet 20 and faces the second-side surface part 20D of the permanent magnet 20. In this example, each of the inner-side internal surface part 11A, the outer-side internal surface part 11B, the first-side internal surface part 11C, and the second-side internal surface part 11D is formed as a rectangular flat surface. The inner-side internal surface part 11A of this embodiment corresponds to the "hole-side flat surface part PH."

The adhesive 30 is a foaming adhesive. More specifically, the adhesive 30 foams and expands and at the same time hardens by being heated at a temperature in a foaming temperature region. In this embodiment, an adhesive composed of a base material containing an epoxy-based resin and of capsules mixed therein that expand upon heating is used as the adhesive 30.

This capsule is, for example, a thermoplastic-resin capsule enclosing a liquid etc. that gasifies upon heating. The adhesive 30 is provided between the internal surface of the magnet insertion hole 11 and the surface of the permanent magnet 20, and bonds together the internal surface of the magnet insertion hole 11 and the surface of the permanent magnet 20. Here, the adhesive 30 is provided at least between the magnet-side flat surface part PM of the permanent magnet 20 and the hole-side flat surface part PH of the magnet insertion hole 11. In this embodiment, the adhesive 30 is provided also between the first-side internal surface part 11C of the magnet insertion hole 11 and the first-side surface part 20C of the permanent magnet 20, and between the second-side internal surface part 11D of the magnet insertion hole 11 and the second-side surface part 20D of the permanent magnet 20, in addition to between the inner-side internal surface part 11A as the hole-side flat surface part PH of the magnet insertion hole 11 and the inner-side surface part 20A as the magnet-side flat surface part PM of the permanent magnet 20. In this embodiment, the adhesive 30 is not provided between the outer-side internal surface part 11B of the magnet insertion hole 11 and the outer-side surface part 20B of the permanent magnet 20, and the outer-side internal surface part 11B and the outer-side surface part 20B are in contact with each other.

The permanent magnet 20 is inserted into the magnet insertion hole 11 with the adhesive 30 applied to the surface of the permanent magnet 20, and is fixed inside the magnet insertion hole 11 with the adhesive 30. Next, the application state of the adhesive 30 on the permanent magnet 20 before the permanent magnet 20 is inserted into the magnet insertion hole 11 (the state shown in FIG. 6) will be described. In this specification, "applying" the adhesive 30 is one form of "providing" the adhesive 30. In the following, the case of "applying" the adhesive 30 will be described as an example. However, "providing" the adhesive 30 is not limited to "applying" the adhesive 30, and for example, pouring the adhesive 30 to a target area by using a mold member is also one form of "providing" the adhesive 30.

The adhesive 30 is applied at least to four corner portions P2 (corners) of the inner-side surface part 20A that is the magnet-side flat surface part PM. In the applied state, the thickness of the adhesive 30 at a central portion P3 (center) is smaller than the thickness thereof at the four corner portions P2 in the magnet-side flat surface part PM. Thus, the four corner portions P2 of the magnet-side flat surface part PM of the permanent magnet 20 inserted in the magnet insertion hole 11 are pressed by the adhesive 30 having foamed on the magnet-side flat surface part PM, while the central portion P3 of the magnet-side flat surface part PM is not pressed by the adhesive 30. Therefore, simply controlling the thickness of the four corner portions P2 of the magnet-side flat surface part PM can place the permanent magnet 20 in a state of being pressed against the surface inside the magnet insertion hole 11 that is a surface opposite to the hole-side flat surface part PH while inclination of the magnet-side flat surface part PM is suppressed.

Here, it is more preferable that the adhesive 30 be applied along at least two opposite side portions P1 (opposite sides) (including the four corner portions P2) among four side portions P1 (four sides) extending along peripheral edges of the magnet-side flat surface part PM, and that the thickness of the adhesive 30 at the central portion P3 of the magnet-side flat surface part PM be smaller than the thickness of the adhesive 30 at the two opposite side portions P1. In this embodiment, as an even more preferred form, the adhesive 30 is applied along all the four side portions P1 extending along the peripheral edges of the magnet-side flat surface part PM, and the thickness of the adhesive 30 at the central portion P3 of the magnet-side flat surface part PM is smaller than the thickness of the adhesive 30 at the four side portions P1.

Figure 4:
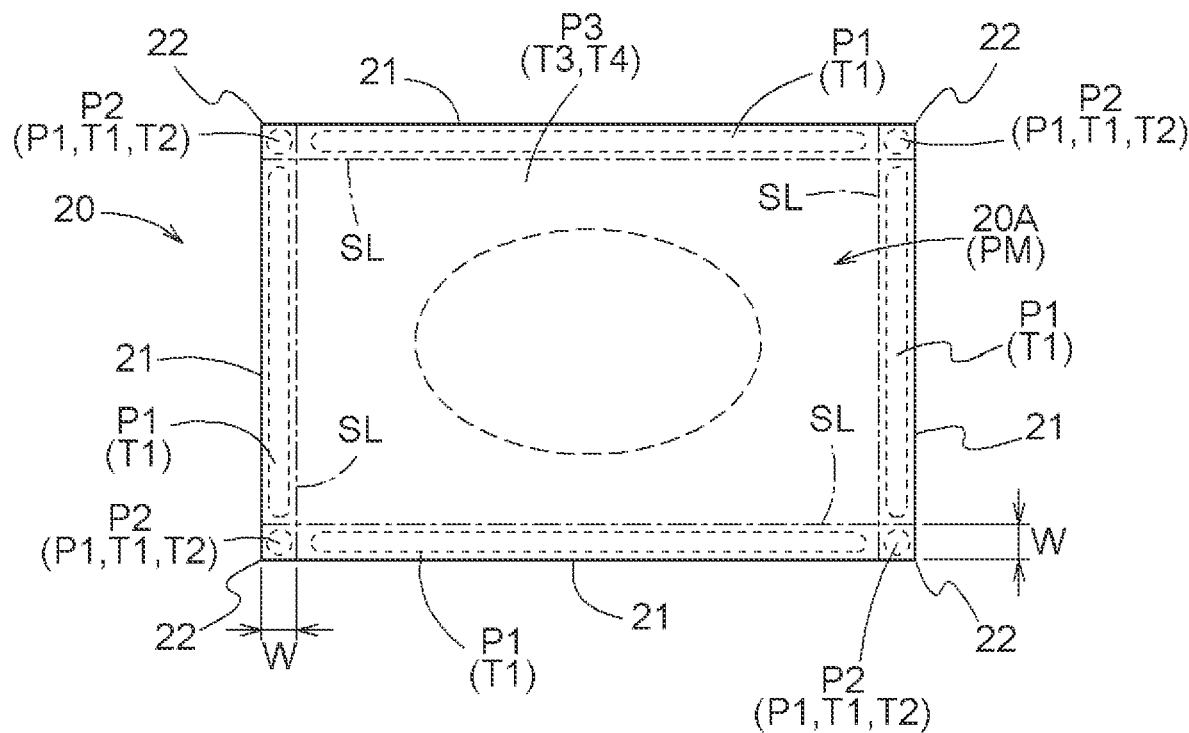
FIG. 4 is a plan view of a permanent magnet.

To make the description of the application state of the adhesive 30 on the inner-side surface part 20A as the magnet-side flat surface part PM easily understandable, imaginary regions into which the inner-side surface part 20A is schematically divided are set as shown in FIG. 4, and the application state of the adhesive 30 will be described using these imaginary regions. As the boundaries of these regions, imaginary boundary lines SL are set at positions offset inward by a set width W from the respective peripheral edges 21 (sides) of the inner-side surface part 20A. In FIG. 4, the imaginary boundary lines SL are indicated by the one-dot dashed lines. Here, the four imaginary boundary lines SL are set respectively along the four sides of the inner-side surface part 20A. The set width W may be any width that is larger than zero but smaller than one third of the length of the short side of the inner-side surface part 20A. The set width W is preferably set to be not smaller than one fiftieth nor larger than one fifth of the length of the short side of the inner-side surface part 20A. Each strip-shaped region having the set width W and surrounded by the sides of the inner-side surface part 20A and the imaginary boundary lines SL parallel to these sides is set as a side region T1. An inside of the region surrounded by the four imaginary boundary lines SL is set as a central region T3. The central region T3 is a region including a point at which two diagonal lines each connecting two corners 22 of the inner-side surface part 20A intersect with each other. Here, a corner region T2 is set at each of the four corners 22 of the inner-side surface part 20A. In this example, the corner region T2 is a region in which two intersecting side regions T1 of the four side regions T1 extending respectively along the sides of the inner-side surface part 20A overlap with each other. The corner regions T2 are regions respectively including the four corners 22.

A part or the whole of each corner region T2 constitutes the corner portion P2. The inner-side surface part 20A has four corner portions P2 corresponding to the four corner regions T2. A part or the whole of each side region T1 constitutes the side portion P1. The inner-side surface part 20A has four side portions P1 corresponding to the four side regions T1. A part or the whole of the central region T3 constitutes the central portion P3. In this embodiment, as an example, the whole side region T1 is set as the side portion P1, the whole corner region T2 is set as the corner portion P2, and the whole central region T3 is set as the central portion P3. In this case, the central portion P3 is a portion of the inner-side surface part 20A other than the side portions P1 and the corner portions P2. In the case where a part of the corner region T2 is set as the corner portion P2, for example, a region occupying a part of the corner region T2 can be set as the corner portion P2 as indicated by the dashed line inside the corner region T2 in FIG. 4. Similarly, in the case where a part of the central region T3 is set as the central portion P3, for example, a region occupying a part of the central region T3 can be set as the central portion P3 as indicated by the dashed line inside the central region T3 in FIG. 4. In the case where a part of the side region T1 is set as the side portion P1, for example, a region occupying a part of the side region T1 can be set as the side portion P1 as indicated by the dashed line inside the side region T1 in FIG. 4.

Figure 6:
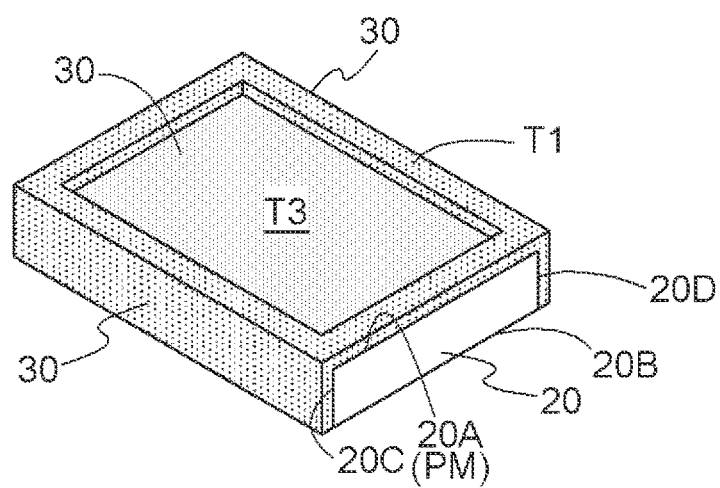
FIG. 6 is a view showing a state after molding of the adhesive applied to the magnet.

In this embodiment, as shown in FIG. 6, the adhesive 30 is applied along all the four side portions P1 including the four corner portions P2 in the rectangular inner-side surface part 20A. Moreover, in this embodiment, the adhesive 30 is also applied to the central portion P3. Thus, in this embodiment, the adhesive 30 is applied to the entire inner-side surface part 20A. However, the thickness of the adhesive 30 at the central portion P3 is smaller than the thickness of the adhesive 30 at the four side portions P1. Moreover, in this embodiment, the adhesive 30 is applied such that the thickness of the adhesive 30 becomes substantially even at the four side portions P1 and at the central portion P3. Thus, surfaces of the adhesive 30 applied to the inner-side surface part 20A facing the radially inner side R1 are flat surfaces having heights set for the respective regions.

In this embodiment, as shown in FIG. 6, the adhesive 30 is applied also to the first-side surface part 20C and the second-side surface part 20D that are the side surface parts, in addition to the inner-side surface part 20A that is the magnet-side flat surface part PM. Here, the adhesive 30 is applied to the entire first-side surface part 20C and the entire second-side surface part 20D, to a substantially even thickness in each part. For each of the first-side surface part 20C and the second-side surface part 20D, the thickness of the adhesive 30 at a central portion of the surface may be set to be smaller than the thickness of the adhesive 30 at four corner portions, two side portions, or four side portions, as in the inner-side surface part 20A. Alternatively, the adhesive 30 may be applied to only one of the first-side surface part 20C and the second-side surface part 20D, and application of the adhesive 30 to the other may be omitted.

In this embodiment, the rotor core 10 includes an oil passage 12 through which oil is supplied from the radially inner side R1 toward a target region T4 of the permanent magnet 20. A plurality of oil passages 12 is formed so as to correspond to the plurality of magnet insertion holes 11. Each oil passage 12 is formed along the radial direction R, and communicates with the magnet insertion hole 11 from the radially inner side R1. The oil passage 12 is formed in the rotor core 10 such that an opening of the oil passage 12 formed in the inner-side internal surface part 11A overlaps the target region T4 of the inner-side surface part 20A of the permanent magnet 20 as seen from the radial direction R. Thus, the oil passage 12 supplies oil from the radially inner side R1 to the target region T4 of the inner-side surface part 20A. The target region T4 is a region of the inner-side surface part 20A in which the thickness of the adhesive 30 is smaller than the thickness thereof at the four corner portions P2. Accordingly, in this embodiment, the central region T3 is the target region T4.

Figure 3:
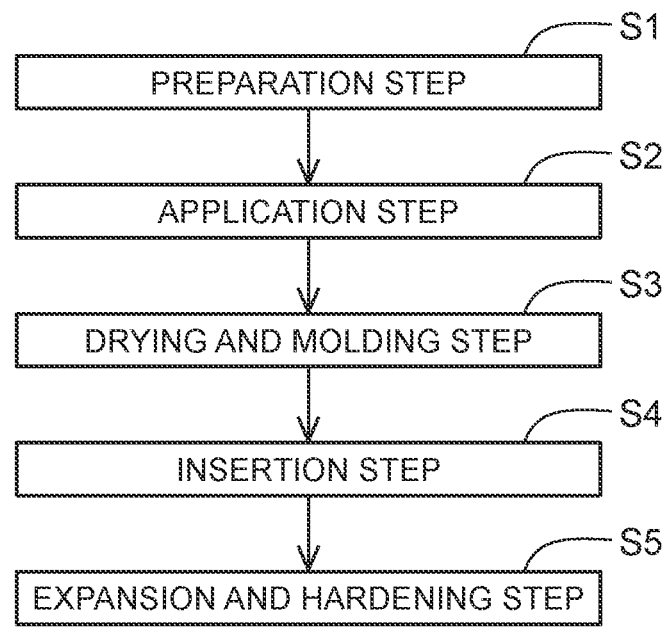
FIG. 3 is a view showing a manufacturing process of a rotor.

Next, a manufacturing method of the rotor 3 will be described. As shown in FIG. 3, to manufacture the rotor 3, a preparation step S1, an application step S2, a drying and molding step S3, an insertion step S4, and an expansion and hardening step S5 are performed. These steps are performed in the order shown. Specifically, the application step S2 is performed after the preparation step S1. The drying and molding step S3 is performed after the application step S2. The insertion step S4 is performed after the drying and molding step S3. The expansion and hardening step S5 is performed after the insertion step S4.

[Preparation Step]

The preparation step S1 is a step of preparing the adhesive 30 to be applied to the permanent magnet 20. As described above, the adhesive 30 is a foaming adhesive that foams and expands and also hardens by being heated at a temperature in the foaming temperature region. The adhesive 30 has viscosity. Before being dried in the drying and molding step S3, the adhesive 30 has relatively high viscosity, but the viscosity decreases as the adhesive 30 is dried in the drying and molding step S3.

[Application Step]

The application step S2 is a step of applying the adhesive 30 to at least the four corner portions P2 of the inner-side surface part 20A as the magnet-side flat surface part PM. In this embodiment, in the application step S2, the adhesive 30 is applied to the inner-side surface part 20A, the first-side surface part 20C, and the second-side surface part 20D of the permanent magnet 20 as described above. More specifically, in this embodiment, in the application step S2, the adhesive 30 is applied to the entire surface of the inner-side surface part 20A, the entire surface of the first-side surface part 20C, and the entire surface of the second-side surface part 20D. In this specification, the application step S2 of applying the adhesive 30 is one form of the "installation step" of providing the adhesive 30. Although the "application step S2"

is described as an example of the "installation step" in this embodiment, the "installation step" is not limited to this example. Other forms of the "installation step" include various steps of providing the adhesive 30, such as a "pouring step" of pouring the adhesive 30 to a target area by using a mold member.

[Drying and Molding Step]

The drying and molding step S3 is a step of drying the adhesive 30 at a temperature lower than the foaming temperature region, and molding the adhesive 30 applied to the inner-side surface part 20A such that the thickness of the adhesive 30 at the central portion P3 of the inner-side surface part 20A is smaller than the thickness of the adhesive 30 at the four corner portions P2. The permanent magnet 20 is inserted into the magnet insertion hole 11 in the insertion step S4 to be described later, and the adhesive 30 applied to the permanent magnet 20 expands and the expanded adhesive 30 presses the four corner portions P2 of the magnet-side flat surface part PM in the expansion and hardening step S5 to be described later. Here, since the thickness of the adhesive 30 at the central portion P3 is small, the central portion P3 of the magnet-side flat surface part PM is not pressed. Therefore, simply controlling the thickness of the four corner portions P2 of the magnet-side flat surface part PM can place the permanent magnet 20 in a state of being pressed against the surface inside the magnet insertion hole 11 opposite to the hole-side flat surface part PH while inclination of the magnet-side flat surface part PM is suppressed.

The adhesive 30 is dried in the drying and molding step S3 by volatilizing a solvent contained in the adhesive 30. For example, the adhesive 30 is dried by blowing air on the adhesive 30 (air blow) or heating the adhesive 30 at a temperature in a drying temperature region. The drying temperature region is set to a temperature region higher than a room temperature but lower than the foaming temperature region. As the adhesive 30 is thus dried, the viscosity of the adhesive 30 decreases.

Figure 5:
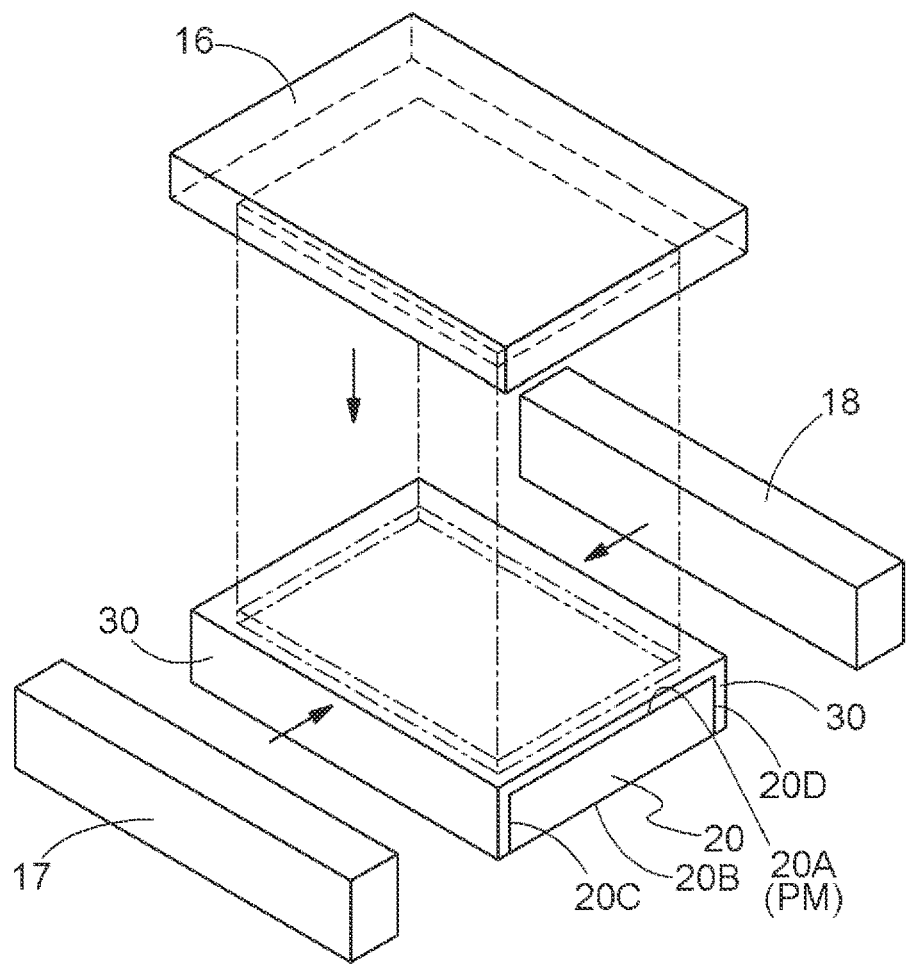
FIG. 5 is a view showing a state before molding of an adhesive applied to the magnet.

In this embodiment, in the drying and molding step S3, the adhesive 30 is molded such that the thickness of the adhesive 30 at the central portion P3 is smaller than the thickness of the adhesive 30 at the four side portions P1. In this molding process, an inner-side mold member 16 is used in this embodiment. The inner-side mold member 16 is a mold member used to mold the adhesive 30 applied to the inner-side surface part 20A. As shown in FIG. 5, when the inner-side mold member 16 is pressed against the adhesive 30 applied to the inner-side surface part 20A, the adhesive 30 is molded such that the thickness of the adhesive 30 at the central portion P3 is smaller than the thickness of the adhesive 30 at the four side portions P1. For this purpose, the inner-side mold member 16 is shaped such that a region of a pressing surface thereof corresponding to the central portion P3 protrudes relative to regions corresponding to the four side portions P1. Moreover, in this embodiment, the inner-side mold member 16 is pressed such that the thickness of the adhesive 30 having been pressed by the inner-side mold member 16 is substantially even at the four side portions P1 and at the central portion P3. For this purpose, the region of the inner-side mold member 16 corresponding to the central portion P3 and the regions thereof corresponding to the four side portions P1 each have a flat surface parallel to the inner-side surface part 20A. Thus, the pressing surface of the inner-side mold member 16 is formed as a stepped flat surface raised at a central portion and recessed at peripheral edge portions. In this embodiment, the inner-side mold member 16 corresponds to the "mold member for molding."

Moreover, in this embodiment, a first-side mold member 17 and a second-side mold member 18 are used to mold the adhesive 30 applied to the first-side surface part 20C and the second-side surface part 20D. The first-side mold member 17 is a member used to mold the adhesive 30 applied to the first-side surface part 20C. As shown in FIG. 5, when the first-side mold member 17 is pressed against the adhesive 30 applied to the first-side surface part 20C, a surface of the adhesive 30 applied to the first-side surface part 20C that faces the first circumferential side C1 is molded into a flat surface. For this purpose, the entire pressing surface of the first-side mold member 17 is one flat surface. The second-side mold member 18 is a member used to mold the adhesive 30 applied to the second-side surface part 20D. As shown in FIG. 5, when the second-side mold member 18 is pressed against the adhesive 30 applied to the second-side surface part 20D, a surface of the adhesive 30 applied to the second-side surface part 20D that faces the second circumferential side C2 is molded into a flat surface. Accordingly, the entire pressing surface of the second-side mold member 18 is one flat surface.

In this embodiment, pressing of the inner-side mold member 16 against the adhesive 30 applied to the inner-side surface part 20A, pressing of the first-side mold member 17 against the adhesive 30 applied to the first-side surface part 20C, and pressing of the second-side mold member 18 against the adhesive 30 applied to the second-side surface part 20D are performed at the same time. Thus, the adhesive 30 applied to these three surface parts is molded at the same time. However, the adhesive 30 on these surface parts may instead be molded sequentially, one surface at a time, or the adhesive 30 on the inner-side surface part 20A may be molded first and then the adhesive 30 on the first-side surface part 20C and the second-side surface part 20D may be molded at the same time.

[Insertion Step]

Figure 7:
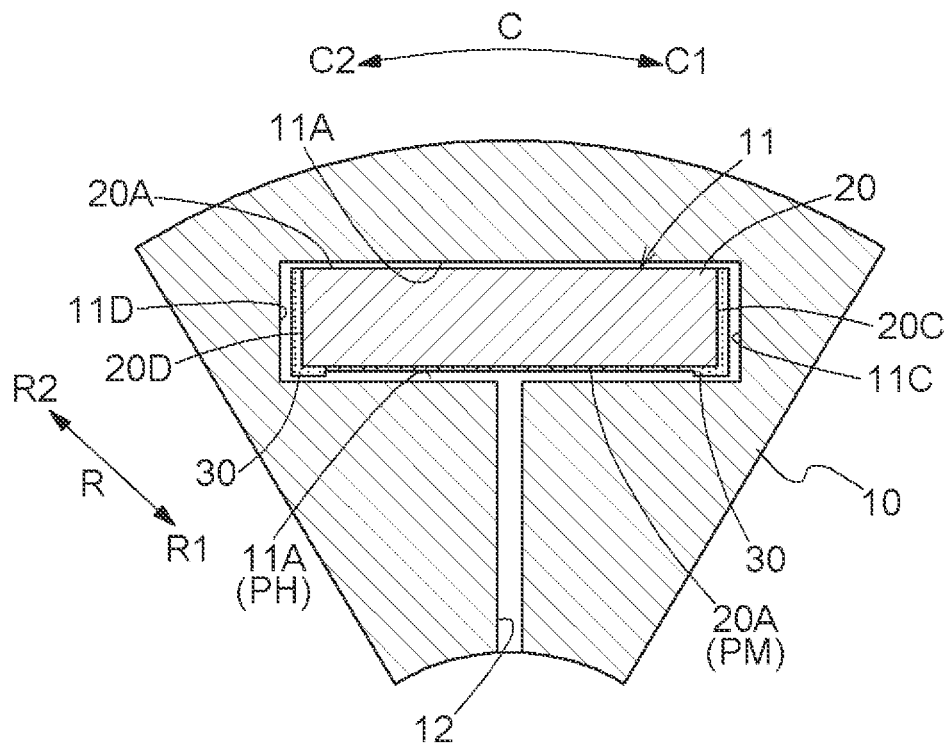
FIG. 7 is a view showing a state before expansion of the magnet.

The insertion step S4 is a step of inserting the permanent magnet 20 into the magnet insertion hole 11. In the preceding drying and molding step S3, the adhesive 30 has been molded to a predetermined thickness and dried so as to have low viscosity as described above. In the insertion step S4, the adhesive 30 has not yet expanded by foaming as shown in FIG. 7. Therefore, the permanent magnet 20 can be easily inserted into the magnet insertion hole 11 without the adhesive 30 interfering with the insertion work. Thus, deformation of the molded adhesive 30 can also be avoided.

[Expansion and Hardening Step]

The expansion and hardening step S5 is a step of expanding and also hardening the adhesive 30 by heating the adhesive 30 at a temperature in the foaming temperature region. In this embodiment, the expansion and hardening step S5 is performed by heating the entire rotor 3 in a state where the permanent magnets 20 with the adhesive 30 applied thereto are inserted in the magnet insertion holes 11. The adhesive 30 applied to the inner-side surface part 20A expands between the inner-side surface part 20A and the inner-side internal surface part 11A. Thus, the permanent magnet 20 is pressed toward the radially outer side R2, and the outer-side surface part 20B of the permanent magnet 20 comes in contact with the outer-side internal surface part 11B of the magnet insertion hole 11. As the adhesive 30 hardens in this state, the permanent magnet 20 is positioned in the radial direction R.

Moreover, in this embodiment, the adhesive 30 applied to the first-side surface part 20C expands between the first-side surface part 20C and the first-side internal surface part 11C, and the adhesive 30 applied to the second-side surface part 20D expands between the second-side surface part 20D and the second-side internal surface part 11D. Thus, the permanent magnet 20 is pressed from both sides in the circumferential direction C and held at a central portion of the magnet insertion hole 11 in the circumferential direction C. As the adhesive 30 hardens in this state, the permanent magnet 20 is positioned in the circumferential direction C.

2. Other Embodiments

Next, other embodiments of a rotor for a rotating electrical machine and a manufacturing method thereof will be described.

Figure 9:
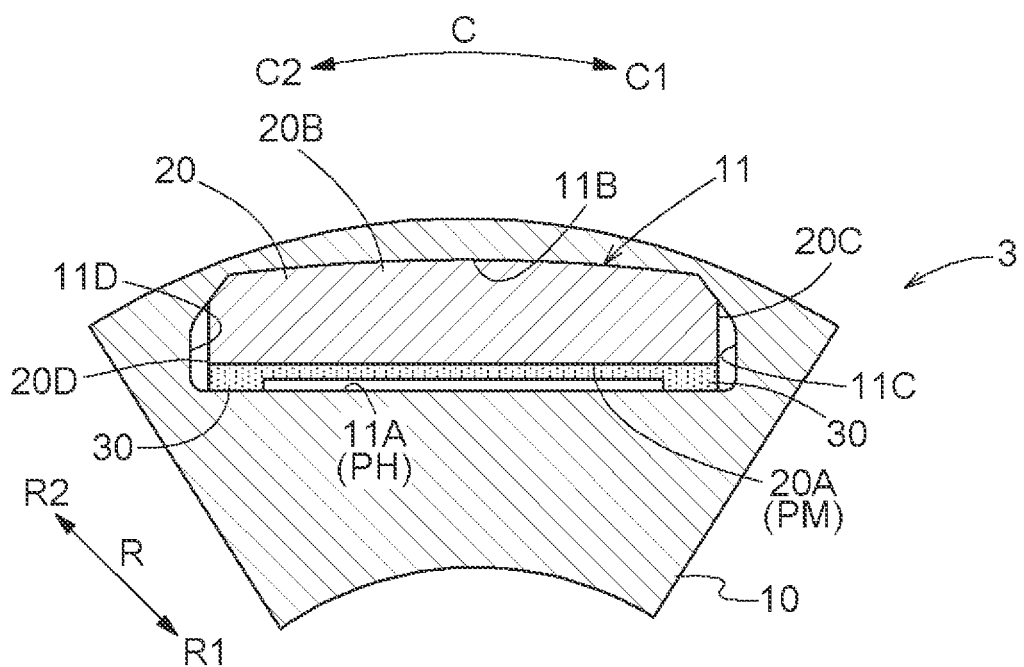
FIG. 9 is a radial sectional view of a rotor core including a D-shaped permanent magnet in another embodiment.

(1) In the above embodiment, the case where the cross-section of the magnet insertion hole 11 orthogonal to the radial direction R has a rectangular shape and the cross-section of the permanent magnet 20 orthogonal to the radial direction R also has a rectangular shape has been described as an example, but the shape of the magnet insertion hole 11 and the shape of the permanent magnet 20 are not limited to this example. For example, as shown in FIG. 9, it is also preferable that the permanent magnet 20 have a protruding shape with a central portion of the outer-side surface part 20B in the circumferential direction C protruding toward the radially outer side R2 compared with both side portions in the circumferential direction C. In the example of FIG. 9, the outer-side surface part 20B has a shape of a portion of a cylindrical surface protruding toward the radially outer side R2. Moreover, in the example of FIG. 9, chamfered portions, i.e., inclined surfaces extending toward an outer side in the circumferential direction C so as to be oriented toward the radially inner side R1, are formed respectively at both side portions of the outer-side surface part 20B in the circumferential direction C. The shape of the inner-side surface part 20A is the same as that in the above embodiment. Thus, in the example of FIG. 9, the cross-section of the permanent magnet 20 orthogonal to the radial direction R has roughly a D-shape. The magnet insertion hole 11 has a shape matching the shape of the permanent magnet 20. In the example of FIG. 9, the outer-side surface part 20B has the shape as described above and the magnet insertion hole 11 has a shape conforming to that shape. Accordingly, it is possible to position the permanent magnet 20 at the correct position in the magnet insertion hole 11 in the circumferential direction C upon expansion of the adhesive 30 applied to the inner-side surface part 20A of the permanent magnet 20. Specifically, as the adhesive 30 applied to the inner-side surface part 20A expands, the cylindrical surface or the inclined surfaces of the chamfered portions of the outer-side surface part 20B of the permanent magnet 20 are pressed against the conforming cylindrical surface or inclined surfaces of the outer-side internal surface part 11B of the magnet insertion hole 11, and thereby the permanent magnet 20 is positioned at the appropriate position in the circumferential direction C according to the shape of the outer-side internal surface part 11B of the magnet insertion hole 11. In the example of FIG. 9, therefore, the adhesive 30 is not applied to the side surface parts of the permanent magnet 20 in the circumferential direction C.

Figure 8:
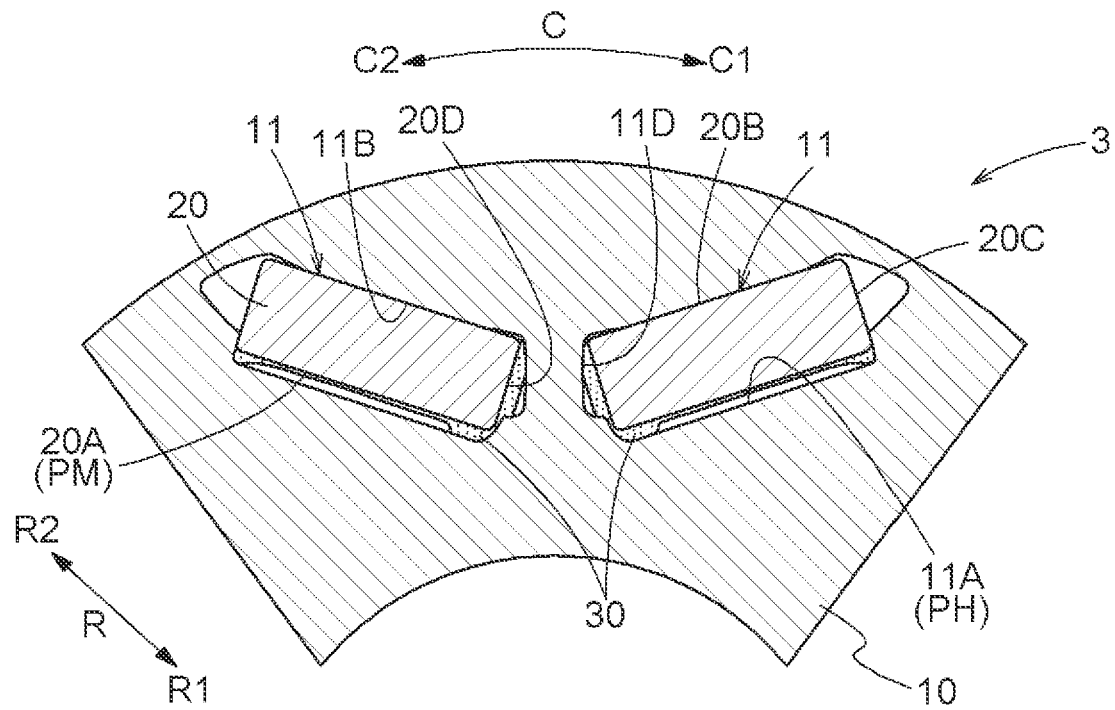
FIG. 8 is a radial sectional view of a rotor core in which a pair of permanent magnets is disposed in a V-shape in another embodiment.

(2) In the above embodiment, the configuration in which the inner-side surface part 20A and the outer-side surface part 20B of the permanent magnet 20 are disposed along the direction orthogonal to the radial direction R has been described as an example, but the arrangement of the permanent magnet 20 is not limited to this example. For example, as shown in FIG. 8, a pair of permanent magnets 20 constituting one magnetic pole may be disposed so as to form a V-shape as seen from the axial direction L. Also in this case, the permanent magnets 20 each having a rectangular parallelepiped shape can be used. To be more specific, one of the pair of permanent magnets 20 that is located on the first circumferential side C1 is disposed with the inner-side surface part 20A and the outer-side surface part 20B inclined such that the permanent magnet 20 extends toward the first circumferential side C1 so that a first circumferential side C1 portion of the permanent magnet 20 is located on the radially outer side R2. The other permanent magnet 20 located on the second circumferential side C2 is disposed with the inner-side surface part 20A and the outer-side surface part 20B inclined such that the permanent magnet 20 extends toward the second circumferential side C2 so that a second circumferential side C2 portion of the permanent magnet 20 is located on the radially outer side R2. In the example of FIG. 8, of both the side surface parts of the permanent magnet 20 in the circumferential direction C, the adhesive 30 is applied to only the side surface part located on the radially inner side R1. Thus, upon expansion of the adhesive 30 applied to that side surface part, the permanent magnet 20 can be positioned by being pressed against the side surface part of the magnet insertion hole 11 located on the radially outer side R2.

In the example of FIG. 8, clearances functioning as a flux barrier are formed on both sides of each magnet insertion hole 11 in the circumferential direction C, continuously with the magnet insertion hole 11.

(3) In the above embodiment, the case where the thickness of the adhesive 30 at the four side portions P1 of the magnet-side flat surface part PM is larger than the thickness of the adhesive 30 at the central portion P3 has been described as an example. However, the adhesive 30 is not limited to this configuration. The adhesive 30 may have any configuration in which the thickness of the adhesive 30 at least at the four corner portions P2 of the magnet-side flat surface part PM is larger than the thickness of the adhesive 30 at the central portion P3. For example, it is also preferable that the thickness of the adhesive 30 at two opposite side portions P1 of the four side portions P1 of the magnet-side flat surface part PM be larger than the thickness of the adhesive 30 at the central portion P3 and the other side portions P1. Alternatively, it is also preferable that the thickness of the adhesive 30 at the four corner portions P2 of the magnet-side flat surface part PM be larger than the thickness of the adhesive 30 at the other portions of the magnet-side flat surface part PM including the central portion P3.

(4) In the above embodiment, the configuration in which the adhesive 30 is applied to the entire magnet-side flat surface part PM including the central portion P3 has been described as an example, but the adhesive 30 is not limited to this configuration. For example, it is also preferable that no adhesive 30 be applied to the central portion P3 and that the thickness of the adhesive 30 at the central portion P3 be zero. In this case, application of the adhesive 30 to all regions other than the regions in which the thickness of the adhesive 30 is set to be larger may be omitted. For example, the adhesive 30 may be applied to only the four corner portions P2 of the magnet-side flat surface part PM and application of the adhesive 30 to the other regions may be omitted.

(5) In the above embodiment, the case where the inner-side surface part 20A is set as the magnet-side flat surface part PM such that a line normal to the magnet-side flat surface part PM has a component oriented toward the radially inner side R1 of the rotor core 10 has been described as an example. However, any surface of the permanent magnet 20 may be set as the magnet-side flat surface part PM. Thus, a line normal to the magnet-side flat surface part PM may have a component oriented toward the radially inner side R1 of the rotor core 10. In other words, the magnet-side flat surface part PM may be the surface facing the radially outer side R2 of the rotor core 10. For example, the outer-side surface part 20B in the above embodiment may be the magnet-side flat surface part PM. In this case, the hole-side flat surface part PH is the surface facing the magnet-side flat surface part PM from the radially outer side R2 of the permanent magnet 20. For example, the outer-side internal surface part 11B in the above embodiment may be the hole-side flat surface part PH.

(6) In the above embodiment, the case where the central region T3 is the target region T4 has been described as an example.

However, in the case where the magnet-side flat surface part PM has a region in which the thickness of the adhesive 30 is small and which is other than the central region T3, this region may be set as the target region T4, and oil may be supplied thereto from the radially inner side R1 through the oil passage 12. It is not absolutely necessary to provide the oil passage 12. Therefore, the oil passage 12 may be omitted from the rotor core 10 as shown in FIG. 8 and FIG. 9, for example.

(7) In the above embodiment, the configuration in which the adhesive 30 is applied to the inner-side surface part 20A, the first-side surface part 20C, and the second-side surface part 20D of the permanent magnet 20 among the inner-side surface part 20A, the outer-side surface part 20B, the first-side surface part 20C, and the second-side surface part 20D has been described as an example, but the surface parts to which the adhesive 30 is applied are not limited to this example. Thus, for example, the adhesive 30 may be applied to only the inner-side surface part 20A as shown in FIG. 9, or the adhesive 30 may be applied to only either of the first-side surface part 20C and the second-side surface part 20D in addition to the inner-side surface part 20A as shown in FIG. 8. Alternatively, the adhesive 30 may be applied to all of the inner-side surface part 20A, the outer-side surface part 20B, the first-side surface part 20C, and the second-side surface part 20D.

(8) In the above embodiment, the example in which the adhesive 30 is molded in the drying and molding step S3 by pressing the mold member against the magnet-side flat surface part PM has been illustrated, but the method of molding the adhesive 30 is not limited to this example. For example, another preferable method is to blowing air on the adhesive 30 (air blow) in the drying and molding step S3 so as to bring the adhesive 30 applied to the magnet-side flat surface part PM close to the corner portions P2 or the side portions P1 of the magnet-side flat surface part PM, and thereby the thickness of the adhesive 30 at the central portion P3 of the magnet-side flat surface part PM is smaller than the thickness of the adhesive 30 at the corner portions P2 or the side portions P1.

(9) The configuration disclosed in each of the above embodiments can be applied in combination with another configuration disclosed in another embodiment unless inconsistency arises. For other configurations, too, the embodiments disclosed in this specification are in every respect merely examples. Therefore, various modifications can be made as appropriate within the scope of the gist of the present disclosure.

3. Summary of Embodiments

The following will describe the summary of the rotor for a rotating electrical machine having been described above.

The rotor for a rotating electrical machine includes the rotor core (10) having the magnet insertion hole (11) extending in the axial direction (L) that is a direction along the rotor rotational axis (A), and the permanent magnet (20) fixed inside the magnet insertion hole (11) with the adhesive (30). In the rotor, the permanent magnet (20) has the magnet-side flat surface part (PM) that is formed as a rectangular flat surface; the magnet insertion hole (11) has, in the internal surface thereof, the hole-side flat surface part (PH) that is formed as a flat surface facing the magnet-side flat surface part (PM); and the adhesive (30) is a foaming adhesive and is provided at least at the four corner portions (P2) of the magnet-side flat surface part (PM), and the thickness of the adhesive (30) at the central portion (P3) of the magnet-side flat surface part (PM) is smaller than the thickness of the adhesive (30) at the four corner portions (P2).

According to this configuration, the adhesive (30) having a foaming property is provided so that the thickness of the adhesive (30) at the four corner portions (P2) is larger than the thickness thereof at the central portion (P3) in the magnet-side flat surface part (PM). The adhesive (30) thus provided at the four corner portions (P2) foams in the manufacturing process and thereby presses the permanent magnet (20) from a hole-side flat surface part (PH) side. Consequently, the permanent magnet (20) is pressed against the internal surface inside the magnet insertion hole (11) that is the surface opposite to the hole-side flat surface part (PH). In this state, the four corner portions (P2) of the magnet-side flat surface part (PM) of the permanent magnet (20) are pressed by the adhesive (30), while the central portion (P3) of the magnet-side flat surface part (PM) is not pressed by the adhesive (30). This makes it likely that the permanent magnet (20) is pressed relatively evenly against the internal surface inside the magnet insertion hole (11) opposite to the hole-side flat surface part (PH). Thus, the permanent magnet (20) is appropriately positioned inside the magnet insertion hole (11).

Since the thickness of the adhesive (30) at the central portion (P3) is smaller than the thickness thereof at the four corner portions (P2) in the magnet-side flat surface part (PM), the four corner portions (P2) of the magnet-side flat surface part (PM) of the permanent magnet (20) are pressed by the adhesive (30) while the central portion (P3) of the magnet-side flat surface part (PM) is not pressed by the adhesive (30). Therefore, it is not necessary to strictly control the thickness of the adhesive (30) at the central portion (P3) of the magnet-side flat surface part (PM) compared with the thickness at the four corner portions (P2). Thus, the thickness of the adhesive (30) is easier to control than in the case where the thickness of the adhesive (30) on the entire magnet-side flat surface part (PM) is controlled in the same manner as the thickness of the adhesive (30) provided at the four corner portions (P2). Thus, the rotor (3) for a rotating electrical machine has a structure that can suppress complicating the manufacturing process.

Here, the adhesive (30) is preferably provided along at least the two opposite side portions (P1) including the four corner portions (P2) among the four side portions (P1) extending along the peripheral edges (21) of the magnet-side flat surface part (PM), and the thickness of the adhesive (30) at the central portion (P3) of the magnet-side flat surface part (PM) is preferably smaller than the thickness of the adhesive (30) at the two opposite side portions (P1).

According to this configuration, it is possible to form the regions in which the thickness of the adhesive (30) is larger than the thickness thereof at the central portion (P3), continuously along the two sides of the magnet-side flat surface part (PM), while ensuring that the four corner portions (P2) of the magnet-side flat surface part (PM) are included in these regions. Thus, the permanent magnet (20) can be appropriately positioned inside the magnet insertion hole (11) while inclination of the magnet-side flat surface part (PM) is suppressed. Moreover, the permanent magnet (20) can be fixed more reliably inside the magnet insertion hole (11).

The adhesive (30) is preferably provided along all the four side portions (P1) extending along the peripheral edges (21) of the magnet-side flat surface part (PM), and the thickness of the adhesive (30) at the central portion (P3) of the magnet-side flat surface part (PM) is preferably smaller than the thickness of the adhesive (30) at the four side portions (P1).

According to this configuration, it is possible to form the regions in which the thickness of the adhesive (30) is larger than the thickness thereof at the central portion (P3), continuously along the four sides of the magnet-side flat surface part (PM), while ensuring that the four corner portions (P2) of the magnet-side flat surface part (PM) are included in these regions. Thus, the permanent magnet (20) can be appropriately positioned inside the magnet insertion hole (11) while inclination of the magnet-side flat surface part (PM) is suppressed. Moreover, the permanent magnet (20) can be fixed even more reliably inside the magnet insertion hole (11).

A line normal to the magnet-side flat surface part (PM) preferably has a component oriented toward the radially inner side (R1) of the rotor core (10).

According to this configuration, the permanent magnet (20) is positioned in a state of being pressed by the adhesive (30) provided on the magnet-side flat surface part (PM) against the surface inside the magnet insertion hole (11) on the radially outer side (R2). Thus, the permanent magnet (20) can be reliably positioned in the radial direction (R). Moreover, in the case where the rotor (3) is used for an inner-rotor rotating electrical machine, a larger amount of magnetic flux can be generated from the permanent magnet (20) toward the stator (2) that is disposed on the radially outer side (R2) relative to the rotor (3). Thus, the characteristics of the rotating electrical machine (1) can be improved.

The permanent magnet (PM) preferably has the side surface parts (20C, 20D) facing the circumferential direction (C) of the rotor core (10), and the adhesive (30) is preferably provided on the side surface parts (20C, 20D) in addition to the magnet-side flat surface part (PM).

According to this configuration, the permanent magnet (20) can be reliably positioned in the circumferential direction (C) inside the magnet insertion hole (11) of the rotor core (10).

A region of the magnet-side flat surface part (PM) in which the thickness of the adhesive (30) is smaller than the thickness of the adhesive (30) at the four corner portions (P2) is preferably defined as the target region (T4), and the rotor core (10) preferably includes the oil passage (12) through which oil is supplied from the radially inner side (R1) toward the target region (T4).

According to this configuration, oil can be circulated through a gap between the target region (T4) of the magnet-side flat surface part (PM) and the hole-side flat surface part (PH) of the magnet insertion hole (11), or this gap can be filled with the oil. This makes it easy to appropriately cool the permanent magnet (20).

The adhesive (30) may be a foaming adhesive that has foamed.

According to this configuration, the permanent magnet (20) can be pressed against the insertion hole (11) by using the thickness of the adhesive (30) having foamed. Thus, the permanent magnet (20) can be fixed inside the insertion hole (11), and as a result, the permanent magnet (20) can be appropriately positioned relative to the insertion hole (11).

The manufacturing method of a rotor for a rotating electrical machine is a manufacturing method of the rotor (3) for a rotating electrical machine including the rotor core (10) having the magnet insertion hole (11) extending in the axial direction (L) that is a direction along the rotor rotational axis (A), and the permanent magnet (20) fixed inside the magnet insertion hole (11) with the adhesive (30), in which the permanent magnet (20) has the magnet-side flat surface part (PM) that is formed as a rectangular flat surface, and the magnet insertion hole (11) has, in the internal surface thereof, the hole-side flat surface part (PH) that is formed as a flat surface facing the magnet-side flat surface part (PM). This manufacturing method includes: the preparation step (S1) of preparing the adhesive (30) that foams and expands and also hardens by being heated at a temperature in the foaming temperature region; the installation step (S2) of providing the adhesive (30) at least at the four corner portions (P2) of the magnet-side flat surface part (PM); the drying and molding step (S3) of, after the installation step (S2), drying the adhesive (30) at a temperature lower than the foaming temperature region, and molding the adhesive (30) provided on the magnet-side flat surface part (PM) such that the thickness of the adhesive (30) at the central portion (P3) of the magnet-side flat surface part (PM) is smaller than the thickness of the adhesive (30) at the four corner portions (P2); the insertion step (S4) of, after the drying and molding step (S3), inserting the permanent magnet (20) into the magnet insertion hole (11); and the expansion and hardening step (S5) of, after the insertion step (S4), expanding and hardening the adhesive (30) by heating the adhesive (30) at a temperature in the foaming temperature region.

According to this configuration, after the adhesive (30) is provided, the drying and molding step (S3) is performed in which the adhesive (30) is dried at a temperature lower than the foaming temperature region, and the adhesive (30) provided on the magnet-side flat surface part (PM) is molded such that the thickness of the adhesive (30) at the central portion (P3) of the magnet-side flat surface part (PM) is smaller than the thickness of the adhesive (30) at the four corner portions (P2). Thus, it is possible to mold the adhesive (30) to have an appropriate thickness according to the location inside the magnet-side flat surface part (PM) while reducing the viscosity of the adhesive (30). Since the insertion step (S4) is performed in a state where the adhesive (30) has been dried and has reduced viscosity, it is possible to insert the permanent magnet (20) into the magnet insertion hole (11) while maintaining the state where the adhesive (30) has been molded to have an appropriate thickness according to the location inside the magnet-side flat surface part (PM). Thereafter, as the adhesive (30) is expanded and hardened, the permanent magnet (20) can be appropriately positioned inside the magnet insertion hole (11). Moreover, according to this configuration, the thickness of the adhesive

(30) can be controlled simply by molding the adhesive (30) such that the thickness of the adhesive (30) at the central portion (P3) of the magnet-side flat surface part (PM) is smaller than the thickness of the adhesive (30) at the four corner portions (P2). Thus, it is also possible to suppress complicating the manufacturing process.

Since the adhesive (30) is molded such that the thickness at the four corner portions (P2) is larger than that at the central portion (P3) in the magnet-side flat surface part (PM), upon foaming in the expansion and hardening step (S5), the adhesive (30) presses the permanent magnet (20) from the hole-side flat surface part (PH) side. Thus, the permanent magnet (20) is pressed against the internal surface inside the magnet insertion hole (11) opposite to the hole-side flat surface part (PH). Here, the four corner portions (P2) of the magnet-side flat surface part (PM) of the permanent magnet (20) are pressed by the adhesive (30), while the central portion (P3) of the magnet-side flat surface part (PM) is not pressed by the adhesive (30). Thus, the permanent magnet (20) is pressed against the internal surface inside the magnet insertion hole (11) opposite to the hole-side flat surface part (PH). Therefore, the permanent magnet (20) can be appropriately positioned inside the magnet insertion hole (11).

In the drying and molding step (S4), the adhesive (30) is preferably molded by pressing the mold member (16) for molding against the adhesive (30) provided on the magnet-side flat surface part (PM).

According to this configuration, simply pressing the mold member (16) against the adhesive (30) can mold the adhesive (30) provided on the magnet-side flat surface part (PM), and thus the adhesive (30) can be easily molded. Moreover, the adhesive (30) provided on the magnet-side flat surface part (PM) can be molded to have a thickness matching the shape of the mold member (16). It is therefore possible to control the thickness of the adhesive (30) with ease and high accuracy.

INDUSTRIAL APPLICABILITY

The technique according to the present disclosure can be applied to a rotor for a rotating electrical machine including a rotor core and a permanent magnet.

The invention claimed is:

1. A rotor for a rotating electrical machine, the rotor comprising:
   a rotor core having a magnet insertion hole extending in an axial direction that is a direction along a rotor rotational axis; and
   a permanent magnet fixed inside the magnet insertion hole with an adhesive,
   wherein the permanent magnet has a magnet-side flat surface that is formed as a rectangular flat surface,
   wherein the magnet insertion hole has, in an internal surface thereof, a hole-side flat surface that is formed as a flat surface facing the magnet-side flat surface, and
   wherein the adhesive is a foaming adhesive and is provided at least at four corners of the magnet-side flat surface, and a thickness of the adhesive at a center of the magnet-side flat surface is smaller than a thickness of the adhesive at the four corners.

2. The rotor for a rotating electrical machine according to claim 1, wherein the adhesive is provided along at least two opposite sides including the four corners among four sides extending along peripheral edges of the magnet-side flat surface, and the thickness of the adhesive at the center of the magnet-side flat surface is smaller than a thickness of the adhesive at the two opposite sides.

3. The rotor for a rotating electrical machine according to claim 2, wherein the adhesive is provided along all the four sides extending along the peripheral edges of the magnet-side flat surface, and the thickness of the adhesive at the center of the magnet-side flat surface is smaller than a thickness of the adhesive at the four sides.

4. The rotor for a rotating electrical machine according to claim 1, wherein a line normal to the magnet-side flat surface has a component oriented toward a radially inner side of the rotor core.

5. The rotor for a rotating electrical machine according to claim 4, wherein:
   the permanent magnet has side surfaces facing a circumferential direction of the rotor core; and
   the adhesive is provided on the side surfaces in addition to the magnet-side flat surface.

6. The rotor for a rotating electrical machine according to claim 5, wherein:
   a region of the magnet-side flat surface in which a thickness of the adhesive is smaller than the thickness of the adhesive at the four corners is defined as a target region; and
   the rotor core includes an oil passage through which oil is supplied from a radially inner side toward the target region.

7. The rotor for a rotating electrical machine according to claim 4, wherein:
   a region of the magnet-side flat surface in which a thickness of the adhesive is smaller than the thickness of the adhesive at the four corners is defined as a target region; and
   the rotor core includes an oil passage through which oil is supplied from a radially inner side toward the target region.

8. The rotor for a rotating electrical machine according to claim 1, wherein the adhesive is a foaming adhesive that has foamed.

9. The rotor for a rotating electrical machine according to claim 1, wherein:
   the adhesive is provided at least between the magnet-side flat surface of the permanent magnet and the hole-side flat surface of the magnet insertion hole,
   the adhesive that is provided at the four corners of the magnet-side flat surface makes contact with the hole-side flat surface, and
   an air gap is provided between the center of the magnet-side flat surface and the hole-side flat surface.

\* \* \* \* \*